Dec. 8, 1942.                O. B. MISZ                2,304,313
SLOPE INDICATOR
Filed May 17, 1941
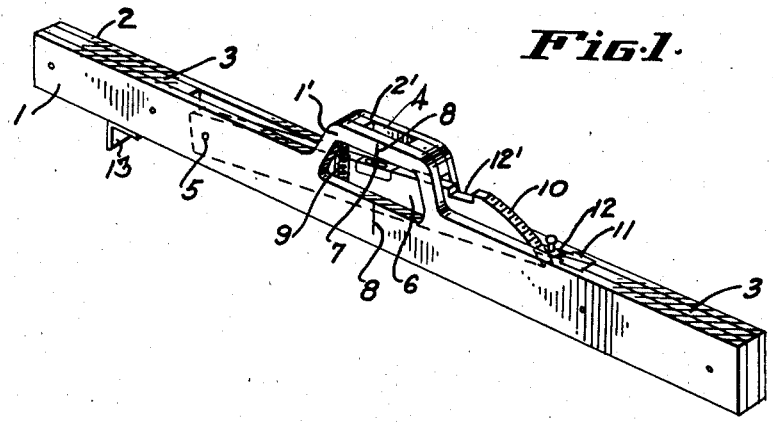
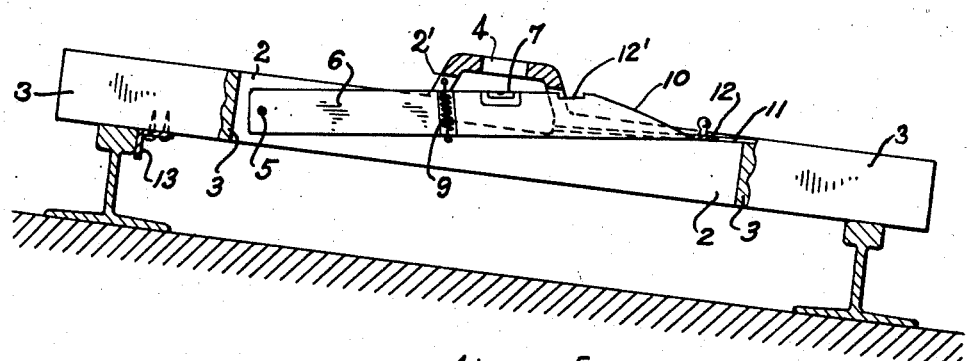
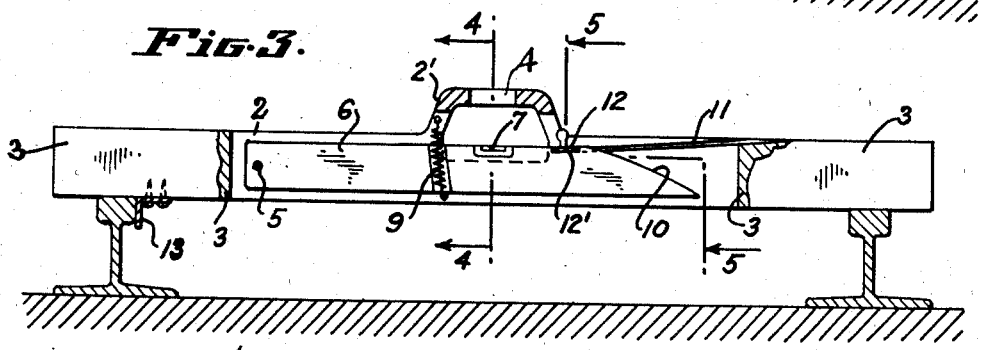
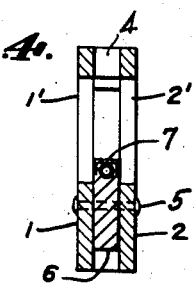 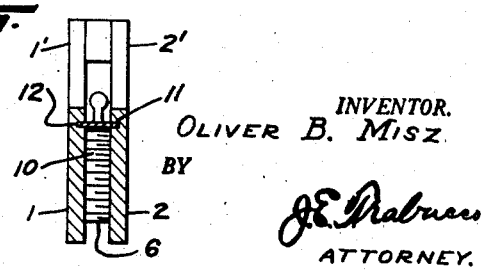
INVENTOR.
OLIVER B. MISZ
BY
J. E. Palmer
ATTORNEY.

Patented Dec. 8, 1942

2,304,313

UNITED STATES PATENT OFFICE 2,304,313

SLOPE INDICATOR

Oliver B. Misz, Redding, Calif.

Application May 17, 1941, Serial No. 393,948

6 Claims. (Cl. 33—213)

This invention relates to improvements in slope indicators, and more particularly to a device for readily indicating whether a structure is positioned at a certain predetermined inclination with respect to the horizontal.

An object of my invention is to provide a novel slope indicator having adjustable means thereon for readily indicating in accordance with the particular pre-adjustment thereof, whether a structure is positioned at a certain predetermined inclination with respect to the horizontal.

Another object of my invention is to provide a novel device for the kind characterized which is particularly useful in laying off slopes or angles, in laying pipe to desired grades and in surfacing the track of railroads.

Other and further objects of my invention will be pointed out hereinafter, indicated in the appended claims, or will be obvious to one skilled in the art upon an understanding of the present disclosure. For the purpose of this application I have elected to show herein certain forms and details of a slope indicator representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims short of the true and most comprehensive scope of the invention in the art.

In the accompanying drawing:

Fig. 1 is a perspective view of a slope indicator embodying the preferred principles of my invention;

Fig. 2 is a front view showing the indicator with one of its side members removed, the remaining side member of the said indicator being operatively positioned with its straight edge resting upon two spaced rails, one of which is superelevated with respect to the other, and the pivoted level arm of the indicator being positioned horizontally and at a certain angle with respect to the straight edge of the said remaining side member;

Fig. 3 is a similar view showing the side member of the indicator with its straight edge horizontally disposed and resting on two spaced rails having the same elevation, the pivoted level arm of the indicator being also positioned horizontally;

Fig. 4 is a section taken on the line 4—4 of Fig. 3; and

Fig. 5 is a section taken on the line 5—5 of Fig. 3.

Referring to the drawings, the numerals 1 and 2 designate two elongated side boards or members which are held in spaced relation by end fillers 3. The side boards 1 and 2 are provided centrally with upstanding inverted U-shaped protuberances 1' and 2', respectively, which are also held in spaced relation by suitable fillers. A centrally disposed sight opening extends vertically between the protuberances 1' and 2'.

Positioned between the side boards 1 and 2 and pivotally mounted at one of its ends on a pin 5 is a level arm 6 which has a glass spirit level bulb 7 carried at its upper edge. The spirit level bulb 7 is so positioned on the arm 6 that when the latter is positioned with its upper and lower parallel straight edges horizontally disposed and parallel to the straight edge of side boards 1 and 2 as shown in Fig. 3, the center of the bubble therein is directly beneath the center of the sight opening 4 and also in line with vertically aligned markings 8 on the sides of the members 1 and 1'. The vertical markings 8 are positioned midway between the ends of the side boards 1 and 2. A spiral spring 9 secured at its ends to the inverted U-shaped member 2' and the pivoted arm 6, exerts an upward pull upon the latter.

The free end of the pivoted level arm 6 is preferably pointed and provided with a curved or inclined upper edge 10 which has a series of graduation marks thereon. The graduation marks extending along the curved edge 10 are of a certain number and they are separated one from the other by a space of predetermined width. The particular graduation mark commencing at the upper end of the curved edge 10 is preferably marked with a zero.

Slidably positioned in inclined parallel grooves 11 located on the inside surfaces of the side boards 1 and 2 is a slide indicator 12 having its inner end provided with a beveled edge which engages with the curved edge 10 of the pivoted arm 6. The upper edges of the grooves 11 are positioned in an inclined plane passing through the pivot pin 5.

The pivot pin 5, the zero graduation mark, and the lower end of the curved edge 10 are points on the circumference of a circle, and the said curved edge is preferably an arc on said circle. The slide indicator 12 engaging with the curved edge 10 of the pivoted arm 6 determines the position of the latter with respect to straight edge at the lower side of the side boards 1 and 2. The upper side of the pivoted arm 6 near the zero graduation mark on the curved edge 10 is provided with a groove 12' within which the slide indicator 12 may become positioned to set the arm in a position with its upper and lower straight edges parallel with the straight edge of the side boards 1 and 2. In such a position the bubble in the spirit level bulb 7 indicates a level position when the straight edge of the side boards 1 and 2 are horizontally disposed. When the arm 6 and the side boards 1 and 2 are positioned as shown in Fig. 3 the device may be used in the usual way as a level.

An angular lug 13 secured to the lower edges of the side boards 1 and 2 at an end thereof serves to readily position the device in operative position upon the rails of a railroad track. When the slope indicator is used by a carpenter, mason or other artisan, it might be desirable to have the angular lug removed from the side boards.

When the device is used to determine whether a structure has a certain inclination with respect to the horizontal, the slide indicator 12 is first moved to a position where its beveled edge registers with a certain graduation mark on the curved edge 10, thereby causing the pivoted arm 6 to be positioned at a certain angle with respect to the straight edge of the side boards 1 and 2. When the device is placed upon the structure, the slope of which is to be determined, the bubble in the spirit level bulb will readily indicate if the said structure has the desired degree of inclination with respect to the horizontal.

It is, of course, to be understood that the curved upper edge 10 of the arm 6 is provided with suitably spaced graduation marks which have been so pre-arranged that by the adjustment of the slide indicator 12 with respect thereto, one may readily set the said arm at any predetermined angle with respect to the horizontal. The graduation marks on the curved edge 10 of the arm are in reality linear measurements indicating degrees of inclination.

It is to be noted that the elongated side boards 1 and 2 when joined together form an elongated member having a slotted opening for the positioning of the pivoted arm 6 and a longitudinally disposed straight edge at its lower side.

The present invention may be used by a draftsman or engineer as an instrument for setting off slope angles. In such an embodiment an arc of a circle marked with suitable graduations is provided on a support, and pivoted at a point on the arc is a straight edge having a sight line which moves over the arc. The reading on the arc where the sight line of the straight edge intersects the same will denote the particular angle at which the straight edge is positioned with respect to the horizontal.

Having described my invention, what I claim is:

1. In a slope indicator, an elongated member having a straight edge at its lower side, an arm pivoted at one end to the member having its free end arcuate shaped and provided with a series of marks indicating linear measurements, the arcuate shaped free end of the arm when the arm is in a certain position and the pivotal point where the arm is attached to the elongated member being arranged along the circumference of a common circle, a level indicator carried by the arm, and adjustable means on the elongated member for indicating in association with the said marks on the arm the relative angular position of the said arm with respect to the straight edge of the elongated member.

2. In a slope indicator, an elongated member having a longitudinally disposed straight edge thereon, an arm pivoted at one end to the elongated member and having its opposite free end provided thereon with a series of arcuately arranged graduation marks, an adjustable indicator positioned adjacent the free end of the arm for indicating in association with the markings thereon the particular degree of inclination of the arm with respect to the straight edge of the elongated member, the said arcuately arranged graduation marks and the pivotal point where the arm is attached to the elongated member being arranged along the circumference of a common circle when the arm and the straight edge are in parallel positions, and a spirit level indicator carried by the arm.

3. In a slope indicator, an elongated member having a longitudinally disposed straight edge thereon, an adjustable arm pivotally secured at one end to the elongated member and having a curved graduated surface at its free end, the said curved graduated surface of the adjustable arm and the point at which the latter is pivotally secured to the elongated member both lying along the circumference of a common circle when the arm is in a certain position with respect to the elongated member, an adjustable indicator carried by the elongated member and engaging with the curved surface of the arm, level indicating means carried by the arm, and means for automatically changing the position of the arm in accordance with the change in position of the adjustable indicator.

4. In a slope indicator, an elongated member having an elongated straight edge thereon, an adjustable arm pivotally secured at one end to the elongated member having an inclined graduated surface at its free end, the said arm being mounted to pivotally move in a plane at right angles to the plane of the straight edge, the point where the arm is pivotally secured to the horizontal member and a plurality of the graduation marks on the inclined graduated surface of the said arm being arranged along the circumference of a common circle, a level indicating means carried by the arm, and adjustable index means associated with the graduated inclined surface of the arm and arranged to maintain the arm in a certain angular position with respect to the straight edge of the elongated member.

5. In a slope indicator, an elongated member having an elongated straight edge thereon, an adjustable arm pivoted at one end to the elongated member and movable in a plane at right angles to the plane of the straight edge, the opposite end of the said arm being provided with a curved end having a series of markings thereon, a slidable indicator carried by the elongated member and engageable with the curved end of the arm, the said slidable indicator being mounted to move only in a plane passing approximately through the pivot upon which the arm is mounted, and spring means for normally maintaining the arm in a position whereby its curved end engages with the slidable indicator.

6. In an instrument for setting off slope angles, a member provided with an arc having graduation points thereon, and a straight edge pivotally mounted to intersect the arc, the said straight edge being pivoted at a point on the circumference of a circle of which the arc is a part.

OLIVER B. MISZ.